Sept. 12, 1933.　　　C. J. WARNKE　　　1,926,074
ELECTROMAGNETIC MOTOR FOR PUMPS AND THE LIKE
Filed Dec. 1, 1931　　　3 Sheets-Sheet 1
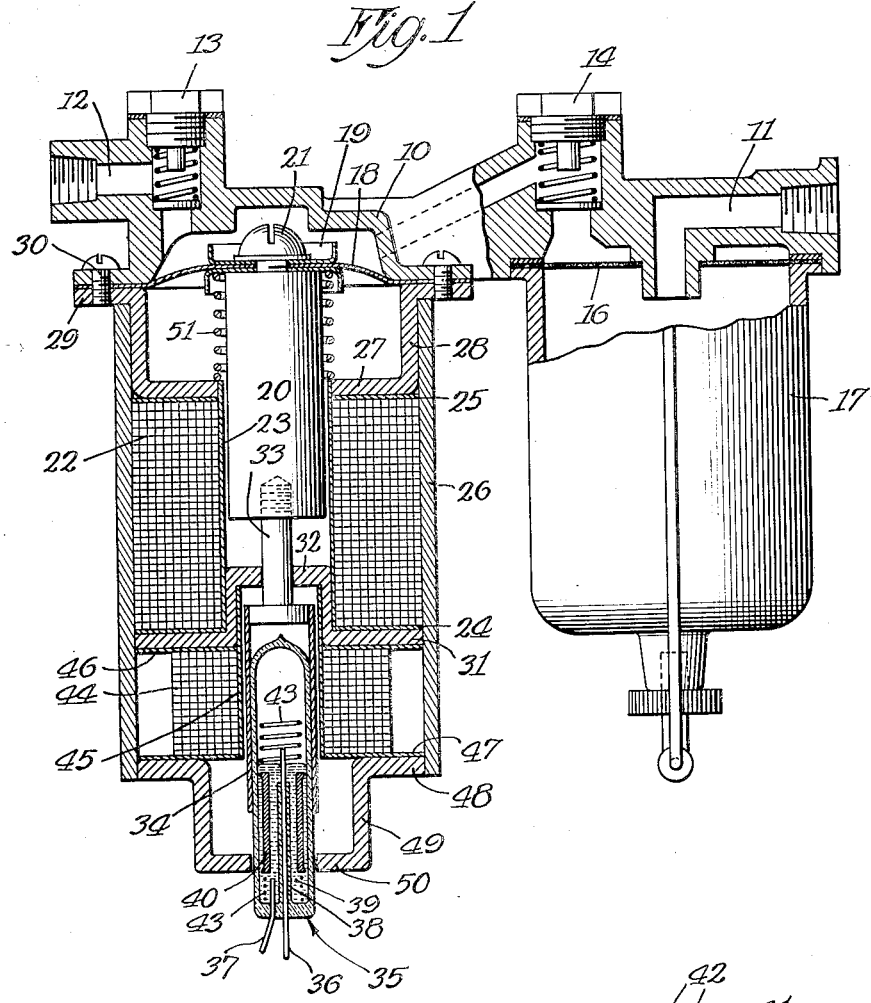
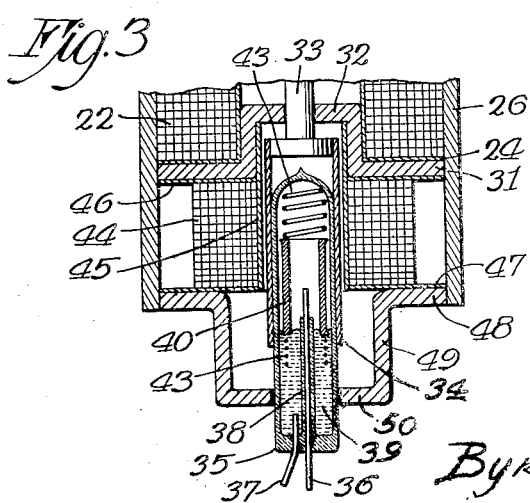
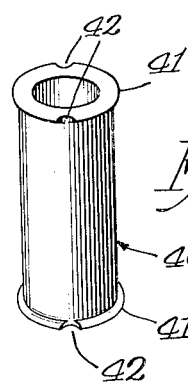
Inventor
Carl J. Warnke Sept. 12, 1933.    C. J. WARNKE    1,926,074
ELECTROMAGNETIC MOTOR FOR PUMPS AND THE LIKE
Filed Dec. 1, 1931    3 Sheets-Sheet 2
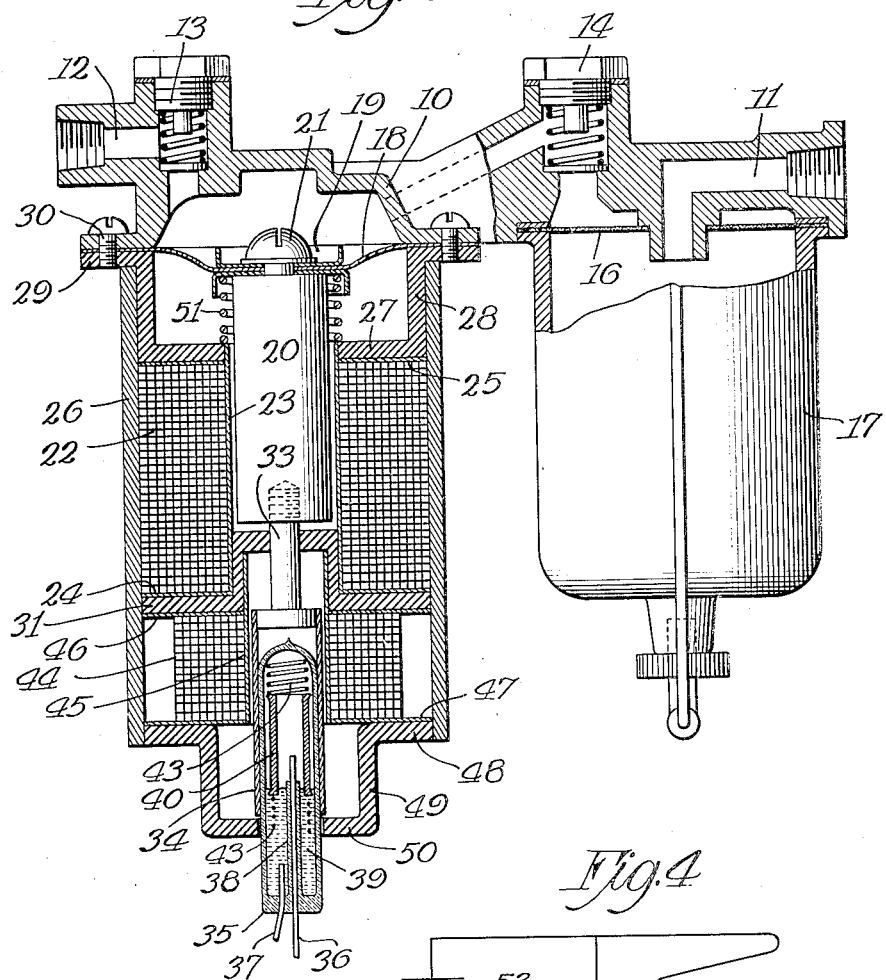
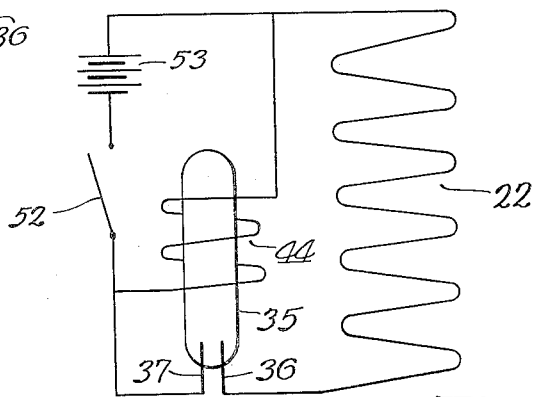
Inventor.
Carl J. Warnke
By Rector, Hibben, Davis & Macauley Attys.

Sept. 12, 1933.   C. J. WARNKE   1,926,074
ELECTROMAGNETIC MOTOR FOR PUMPS AND THE LIKE
Filed Dec. 1, 1931   3 Sheets-Sheet 3
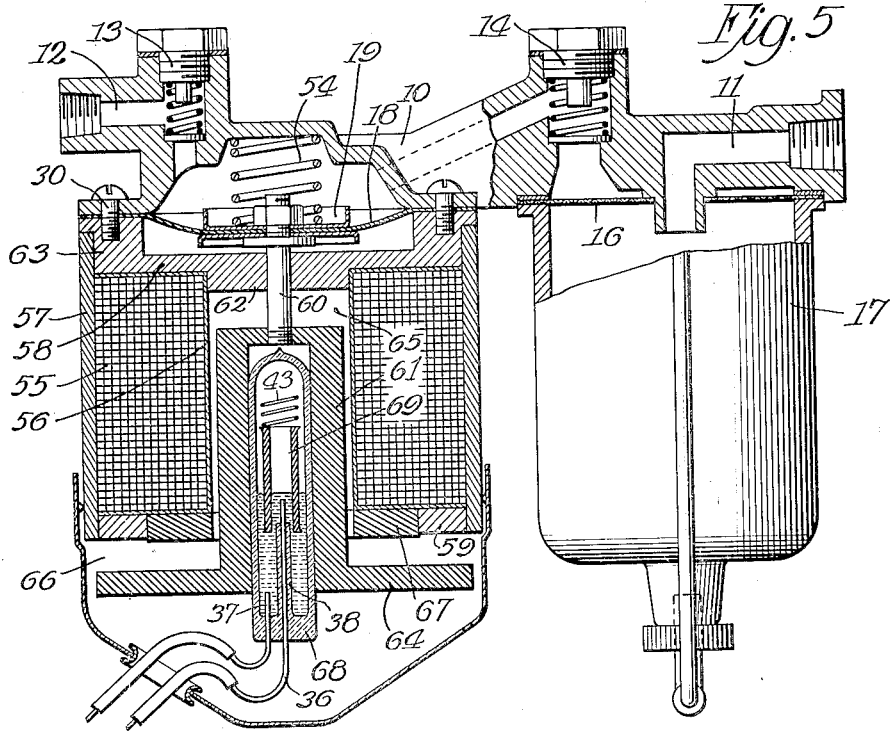
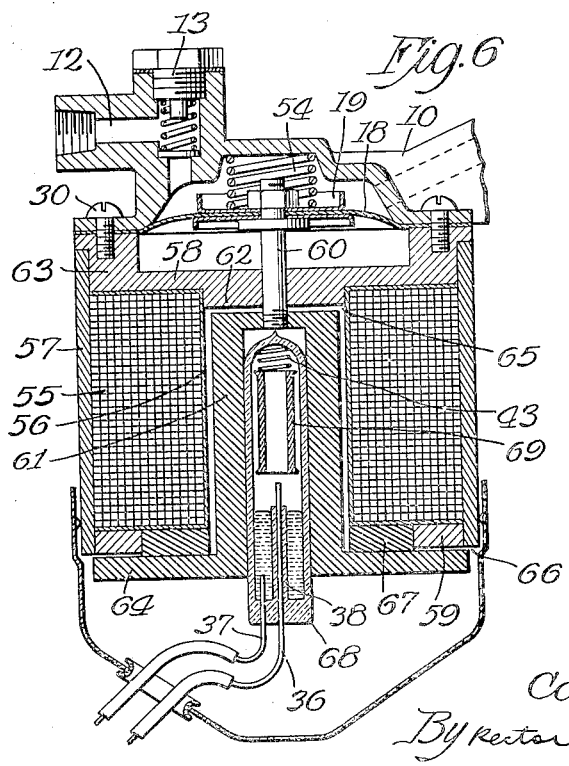
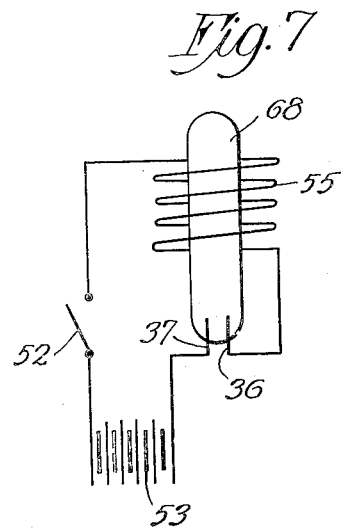
Inventor:
Carl J. Warnke Patented Sept. 12, 1933

1,926,074

UNITED STATES PATENT OFFICE 1,926,074

ELECTROMAGNETIC MOTOR FOR PUMPS AND THE LIKE

Carl J. Warnke, Elkhart, Ind., assignor, by direct and mesne assignments, to The Adams & Westlake Company, Chicago, Ill., a corporation of Illinois Application December 1, 1931. Serial No. 578,398

16 Claims. (Cl. 172—126)

Magnetic motors have been proposed for various purposes from time to time, but the make and break mechanism for intermittently energizing the magnets has rendered them short lived and unreliable in regular service and dangerous where inflammables are being used with the result that such motors have not been a commercial success.

The principal objects of this invention are to eliminate the defects of prior constructions and provide safe and efficient motors especially adapted for driving fuel pumps for internal combustion engines and useful for various other purposes. Further objects and advantages will be revealed as the disclosure proceeds and the description is read in connection with the accompanying drawings showing two forms designed to replace the mechanical drives for gasoline pumps now in use to some extent and for convenience those disclosed in the patents to Kamrath No. 1,742,770 January 7, 1930, McKinely No. 1,738,786 December 10, 1929, Nutt No. 1,738,790 December 10, 1929, may be referred to as examples.

Fig. 1 is a vertical section through a diaphragm gasoline pump of familiar construction, and an electromagnetic motor embodying this invention, the parts of the latter being shown in the positions they occupy at an initial stage in the cycle of operation;

Fig. 2 is a similar sectional view showing the parts in a position they assume at an intermediate stage in the cycle of operation;

Fig. 3 is a fragmentary sectional view similar to Fig. 1, showing the parts in the position they occupy at the closing of the starting switch;

Fig. 4 is a wiring diagram for the electrical connections, and

Figs. 5 and 6 are vertical sections similar to Figs. 1 and 2, showing another modified form, Fig. 7 is a wiring diagram for Figs. 5 and 6, and Fig. 8 is a perspective view of a displacer for varying the level of the liquid in the switch.

But these specific illustrations and the specific description are used for the purpose of disclosure only and should not be understood as the only forms contemplated, for the invention is capable of many and varied embodiments.

The body casing 10 of the pump with the inlet 11, the outlet 12, the check valves 13 and 14, the screen 16, the sight chamber 17, the fabric diaphragm 18 and the cup washers 19, will be readily recognized.

The reciprocating driving member of the mechanical pump is replaced by an iron armature or core 20 about two inches long, by three-quarters of an inch in diameter, secured to the diaphragm and cup washers by a screw 21. It cooperates with a solenoid 22 of three ohms resistance, nineteen gauge wire, wound on a brass spool formed by sleeve 23 about seven-eighths of an inch in diameter and two rings 24 and 25.

The shell of the solenoid is formed by an iron cylinder 26, and upper and lower heads. The upper head includes an annular bottom 27, side wall 28 and a lateral flange 29 secured to the pump casing by screws 30 and clamping the margin of the diaphragm 18. The lower head is a disk 31 having its central portion struck up at 32, and perforated to make passage for a brass screw 33 set in the armature 20.

An iron sleeve 34, seven-sixteenths of an inch inside diameter and two and one-quarter inches long, is brazed to the head of the screw 33 and projects downwardly. An envelope 35 of glass, about three-sixtyfourths of an inch thick and two and one-quarter inches long, is fitted tightly in the sleeve 34 and made fast by rubber cement. Sealed in the lower end of the envelope 35 are lead-in wires 36 and 37, the former being extended well into the tube and provided with an insulating shield 38 that extends to within a short distance of its upper end. Inside the envelope is a charge of mercury 39, floating on, or partly immersed in which is a tubular displacer 40, having slight spool-shaped flanges 41 at its ends, notched at 42, as best illustrated in Fig. 8. It is made of iron about three-quarters of an inch long and of twenty-five thousandths of an inch wall thickness. Its movements toward the ends of the tube are restricted by light springs 43 of non-magnetic material.

An auxiliary solenoid 44 of forty-five ohms resistance, twenty-eight gauge wire, is wound on a brass spool formed by the sleeve 45 of the rings 46 and 47.

The shell of the auxiliary solenoid is formed by the lower head 31, a prolongation of the cylinder 26 and a bottom head comprising a disk 48, a downwardly directed wall 49 and an inwardly directed flange 50 encircling the envelope 35 with clearance.

The diaphragm 18 is normally held in the position shown in Fig. 1 by a steel spring 51 substantially the same as that ordinarily used with such pumps driven by mechanical motors.

*Operation*

The reciprocation of the armature 20 causes the diaphragm to move first down and then up, drawing the gasoline in at 11, through the sight chamber 17, past the check valve 14 and forcing it out through the check valve 13, towards the carburetor.

When the switch 52 (Fig. 4) is open the auxiliary solenoid 44 is deenergized and the displacer 40 floats so high that the mercury level is below the top of the insulating shield 38 and the wire 36, as shown in Fig. 3. Upon the switch 52 being closed, current flows through the coil 44, and there is a momentary repulsion between the shield 34 and the displacer 40, while the magnet builds up, and that gives the displacer a preliminary downward movement into the mercury. When the magnet becomes saturated, the magnetic circuit includes the sleeve 34, the flange 31, the lower part of the cylinder 26, the bottom head 48, and the displacer 40. The gap between the lower end of the sleeve 34 and the flange 50, is then about five-sixteenths of an inch; and by virtue of the well known law, the displacer descends further to reduce that gap as much as possible, whereby it is forced to a position substantially as illustrated in Fig. 1, raising the level of the mercury above the sleeve 38 and closing the circuit through the solenoid 22. This being energized, the magnetic circuit includes the armature 20, the flange 27, the cylinder 26, the lower head 31, leaving a gap between that head and the lower end of the armature 20, with the result that the armature descends in an effort to close the gap.

The same movement causes the sleeve 34 to reduce the gap between its lower end and the flange 50. And in so doing it diverts the magnetic flux from the displacer 40 and allows it to rise from the position shown in Fig. 1 towards the position shown in Fig. 2.

In the construction illustrated, the movement of the armature and, therefore, the sleeve 34 is slightly in excess of one-quarter of an inch so that at the bottom of the stroke the gap between the sleeve 34 and the flange 50 is practically eliminated and the displacer is substantially free to float, and allow the mercury to open the circuit of the solenoid 22. The spring 51 then restores the parts to the position shown in Fig. 1, (except that the displacer is floating as in Fig. 3), and as the sleeve 34 rises the magnetic flux through the displaced 40 increases, and it is again drawn down to the position shown in Fig. 1, closing the circuit in the solenoid 22. And so the cycles continue.

Obviously the up-stroke is varied by the resistance to the flow of the gasoline from the pump chamber towards the carburetor, but since the closing of the circuit through the solenoid 22 is controlled by the magnetic flux through the displacer, that closing is regulated to suit the needs of the fuel beyond the pump.

As indicated in the diagram Fig. 4, the motor is connected to the usual 6—8 bolt battery 53 of the ignition system and the switch 52 is conveniently made by adding contacts to the ignition switch.

In the alternative form, illustrated on sheet 3 of the drawings, the suction stroke of the diaphragm is effected by a steel spring 54, and the exhaust stroke is effected by the electromagnetic motor.

The solenoid 55 of three ohms resistance, seventeen gauge wire, is wound on a brass spool 56. The shell is formed by an iron cylinder 57 about three-thirty-seconds of an inch thick and two and three-quarters inches long, an upper head 58 and a lower head 59 are both of iron. The upper head is perforated to receive a brass bolt 60, by which the diaphragm is connected with the armature 61. Its lower side is provided with a short flange 62 extending into the spool 56, and its upper side with a flanged wall 63, secured to the pump casing 10 by screws 30.

The armature is a hollow body of iron about one inch in diameter and about two inches long above the flange 64, which is about three-sixteenths of an inch thick and approximately three inches in diameter.

The gaps 66 and 65 shown in Fig. 5, are about nine-sixty-fourths of an inch and one-quarter of an inch respectively, and inside the head 59 is a brass ring 67 about two and one-eighth inches in diameter and a little over three-sixteenths of an inch thick.

The mercury switch 68 is substantially the same as that shown on sheets 1 and 2 except that the displacer 69 is given sufficient weight to raise the level of the mercury substantially as shown in Fig. 5, when the magnet is deenergized.

As indicated in Fig. 7, the mercury switch is in circuit with the solenoid 55, and the battery 53 of the ignition system, which circuit is controlled by a switch 52 made by adding contacts to the ignition switch.

Operation

The normal position of rest is indicated in Fig. 5, with the displacer 69 raising the level of the mercury above the insulating sleeve 38 on the long central electrode, whereby the circuit is closed with the side electrode 37. Upon closing the switch 52, the solenoid is energized and the armature 61 rises from the position shown in Fig. 5 towards the position shown in Fig. 6. When it has practically reached the last position, the magnetic flux through the displacer 69 becomes so strong as to lift it from the mercury, or relieve its pressure on the mercury to such an extent that the level thereof drops below the top of the sleeve 38, interrupting the circuit and deenergizing the magnet, whereupon the spring 54 forces the parts back to the position shown in Fig. 5, the displacer 69 sinks again to the position shown in Fig. 5, closing the circuit, and the armature rises again.

The exhaust stroke of the pump in this form being effected by the magnet, the current is on through a longer working period than in the form first described, but as a general thing, the current will be supplied by the generator, which has ample capacity and hence the greater current consumption becomes of little economical importance.

These two illustrative embodiments are thought to be sufficient to show how the substance of the invention may be applied and the specifications given are sufficient to guide those skilled in the art in matter of design for particular uses.

From these illustrations it will be apparent that the danger from fire and explosions is entirely eliminated by enclosing the actual breaking point of the circuit in a sealed envelope; the circuit being closed by mercury there is no possible trouble with sticking contacts or faulty connections.

The specifications for the glass of the envelope, the lead-in wires, the electrodes and any gas-fill is largely a matter of selection. Corning G–702 P glass, Dumet or Trimet wire, helium and nitrogen gas-fills, tungsten and tantalum electrodes, are all available on the market, and have been found satisfactory in making switches to stand several million operations in service.

In the switches illustrated the contacts for the mercury are formed by bare portions of the lead-in wires, but that is an optional feature of construction.

In both the forms illustrated the switch is carried by and moves with the armature, which arrangement has advantages in timing the stroke as well as economy in manufacture, but mounting the switch on a relatively fixed support would in nowise depart from the spirit of the invention.

Where iron is mentioned in this specific description it will be understood that steel, nickel, cobalt and various alloys of the same, all of which are magnetic material, are to be considered as equivalents; and where brass is mentioned the equivalent non-magnetic materials are too numerous to mention.

What I claim is—

1. In a magnetic motor, an electromagnet, an operating switch for the magnet including spaced electrodes and a liquid sealed in an envelope, and a displacer within the envelope responsive to magnetic flux to vary its effect on the liquid level.

2. In a magnetic motor, an electromagnet, an operating switch for the magnet including spaced electrodes and a liquid sealed in an envelope, and a displacer within the envelope responsive to magnetic flux to vary its effect on the liquid level, and means moved by the magnetic flux acting upon the displacer.

3. In a magnetic motor comprising an electromagnet and a reciprocating armature, the combination of an operating switch including a sealed envelope containing electrodes, a body of liquid, and a displacer responsive to magnetic flux and cooperating with the liquid to vary its level and magnetic means for shifting the displacer.

4. In a magnetic motor comprising an electromagnet and an armature moved by the magnet, the combination of an operating switch for the magnet comprising a sealed envelope containing electrodes, a body of liquid and a displacer for varying the level of the liquid, at least a portion of the displacer being magnetic material, an auxiliary magnet for the displacer, and means moved by the first mentioned magnet for varying the effect of the auxiliary magnet on the displacer.

5. In a magnetic motor comprising an electromagnet and an armature moved by the magnet, the combination of an operating switch for the magnet comprising a sealed envelope containing electrodes, a body of liquid and a displacer for varying the level of the liquid, at least a portion of the displacer being magnetic material, an auxiliary magnet for the displacer, and a shield moved by the first mentioned magnet to vary the magnetic flux from the auxiliary magnet acting upon the displacer.

6. In a magnetic motor comprising an electromagnet and an armature moved by the magnet, the combination of an operating switch for the magnet comprising a sealed envelope containing electrodes, a body of liquid and a displacer for varying the level of the liquid, at least a portion of the displacer being magnetic material, an auxiliary magnet for the displacer, and a tubular magnetic shield for the displacer operated by the first mentioned magnet.

7. In a magnetic motor comprising an electromagnet and an armature moved by the magnet, the combination of an operating switch for the magnet comprising a sealed envelope containing electrodes, a body of liquid and a displacer for varying the level of the liquid, at least a portion of the displacer being magnetic material, an auxiliary magnet for the displacer, and a shield moved by the first mentioned magnet and in which the switch is mounted.

8. In a magnetic pump comprising a solenoid, an armature for the solenoid and a spring for displacing the armature, the combination of an operating switch comprising a sealed envelope containing electrodes, a body of liquid, and a displacer, at least a portion of which is of magnetic material, an auxiliary magnet surrounding the switch, a shell for the auxiliary solenoid leaving a gap in the interior in an area traversed by the displacer, and a shield moved by the first mentioned solenoid to reduce the gap and thereby reduce the effect of the auxiliary solenoid on the displacer.

9. In a magnetic pump comprising a solenoid, a hollow armature extending into the solenoid and a spring for displacing the armature, the combination of an operating switch comprising a sealed envelope extending into the armature and containing electrodes, a body of liquid and a displacer, at least a portion of which is of magnetic material, the displacer being of sufficient weight to close the switch when the solenoid is deenergized and sufficiently light to be lifted when the armature is drawn into the solenoid.

10. In a magnetic pump, a solenoid, a hollow armature extending into the solenoid and having a flange from its projecting end, a shell for the solenoid including end portions arranged to leave a gap between the flange and one end portion of the shell and a similar gap between the opposite end of the armature and the other end portion of the shell, a spring tending to maintain the gaps and an operating switch including a sealed envelope projecting into the armature and containing electrodes, a body of liquid and a displacer, at least a portion of which is of magnetic material.

11. In a magnetic motor comprising an electromagnet and an armature moved by the magnet, the combination of a sealed envelope, switch contacts within the envelope and a magnetic switch operating device within the envelope and operating one of the contacts.

12. In a magnetic motor, a solenoid, a hollow armature projecting into the solenoid and a switch comprising a sealed envelope projecting into the armature, contacts within the envelope and a magnetic switch operating device within the envelope cooperating with one of the contacts.

13. In a magnetic motor, a solenoid, a shell of magnetic material enclosing the solenoid at one end, the outside, and the outer portion of the other end, a hollow armature projecting into the solenoid and having a flange overlapping the last mentioned portion of the shell, a non-magnetic ring between the flange and the solenoid within the shell, a switch and a magnetic switch operating member within the hollow armature.

14. In a magnetic motor comprising an electromagnet and an armature moved by the magnet, the combination of a sealed envelope, switch contacts within the envelope, magnetic means for operating the contacts and means for varying the effect of the magnetic means.

15. In a magnetic motor, the combination with an electromagnet and an armature moved by said magnet, of a mercury switch comprising a sealed envelope, electrodes electrically connected to said magnet, a mass of mercury, and a displacer periodically subjected to the flux of said magnet and shiftable to alternately place the mercury in circuit-making and breaking positions with said electrodes.

16. In a magnetic motor, the combination with an electromagnet and a reciprocable armature spring-actuated in one direction and moved in the opposite direction by said magnet, of a mercury switch comprising a sealed envelope mounted for movement with said armature, electrodes electrically connected to said magnet, a mass of mercury, and a displacer movable relative to said envelope, said displacer being periodically subjected to the flux of said magnet and biased in a predetermined position when free from magnetic influence, the relative movement of said envelope and displacer effecting a shifting of said mercury into circuit-making and breaking positions with said electrodes.

CARL J. WARNKE.